United States Patent
Schwegler et al.

(10) Patent No.: US 12,518,578 B2
(45) Date of Patent: Jan. 6, 2026

(54) ADAPTIVE CONTROLLER PERFORMANCE ANALYZER AND ALGORITHM OPTIMIZER

(71) Applicant: CONTINENTAL AUTOMOTIVE SYSTEMS, INC., Auburn HIlls, MI (US)

(72) Inventors: Jason Brian Schwegler, Grand Blanc, MI (US); Gustavo M. Nunes, Midland, MI (US); Omkar Karve, Farmington Hills, MI (US); Nagaraju Akepogu, Grand Blanc, MI (US)

(73) Assignee: AUMOVIO Systems, Inc., Auburn Hills, MI (US)

( * ) Notice: Subject to any disclaimer, the term of this patent is extended or adjusted under 35 U.S.C. 154(b) by 299 days.

(21) Appl. No.: 17/893,679

(22) Filed: Aug. 23, 2022

(65) Prior Publication Data
US 2024/0071151 A1  Feb. 29, 2024

(51) Int. Cl.
*G07C 5/08* (2006.01)
*G05D 1/00* (2024.01)

(52) U.S. Cl.
CPC ......... *G07C 5/0841* (2013.01); *G05D 1/0212* (2013.01); *G07C 5/0808* (2013.01)

(58) Field of Classification Search
CPC .... G07C 5/0841; B60W 60/00; G05D 1/0212
USPC .......................................................... 701/23
See application file for complete search history.

(56) References Cited

U.S. PATENT DOCUMENTS

| | | | | |
|---|---|---|---|---|
| 2019/0121348 | A1* | 4/2019 | Cella | G06N 3/084 |
| 2019/0232955 | A1* | 8/2019 | Grimm | G06V 10/803 |
| 2021/0114617 | A1* | 4/2021 | Phillips | G01C 21/3453 |
| 2021/0163021 | A1* | 6/2021 | Frazzoli | H04W 4/48 |
| 2021/0271245 | A1* | 9/2021 | Bradley | G05D 1/227 |
| 2023/0377390 | A1* | 11/2023 | Yuan | G05B 23/0254 |

FOREIGN PATENT DOCUMENTS

| | | | | |
|---|---|---|---|---|
| DE | 102012023632 | A1 * | 6/2014 | B60L 1/003 |
| DE | 102019102173 | A1 | 8/2019 | |

OTHER PUBLICATIONS

DE Office Action dated Apr. 21, 2023 for DE application No. 10 2022 133 035.4.

* cited by examiner

*Primary Examiner* — Navid Z. Mehdizadeh
*Assistant Examiner* — Vincent Feng

(57) ABSTRACT

A number of variations may include a system and method may include autonomous driving systems including an algorithm analyzing motion controller performance in real time with respect to a set of attributes. The system and method may include an algorithm monitoring conditions such as monitoring actuations, vehicle dynamics, vehicle operating environment, and vehicle capability. The system and method may include an algorithm evaluating said conditions to determine which controller is best suited to the current situation during live vehicle operations.

16 Claims, 2 Drawing Sheets

ADAPTIVE CONTROLLER PERFORMANCE ANALYZER AND ALGORITHM OPTIMIZER

TECHNICAL FIELD

The field to which the disclosure generally relates to autonomous driving real-time algorithm analysis and controller performance optimization.

BACKGROUND

Vehicles may include autonomous driving systems including single or multiple control algorithms. Certain operating conditions are handled best by a single motion control algorithm across all vehicle capability levels. Other operating conditions may benefit from the implementation of multiple motion control algorithms.

Vehicles may include autonomous driving systems implementing preselected or predetermined controllers tuned prior to operation and which may be fixed during typical operating conditions. These systems may prevent live controller selection, live controller calibration, and use of controllers designed for multiple operating situations.

Depending on complexity of vehicle trajectory, cost of path deviation, computational task priority and loading, and energy available to complete the planned path, the optimal algorithm may vary quite dramatically.

BRIEF DESCRIPTION OF THE DRAWINGS

Select examples of variations within the scope of the invention will become more fully understood from the detailed description and the accompanying drawings, wherein.

SUMMARY OF ILLUSTRATIVE VARIATIONS

Figure 1:
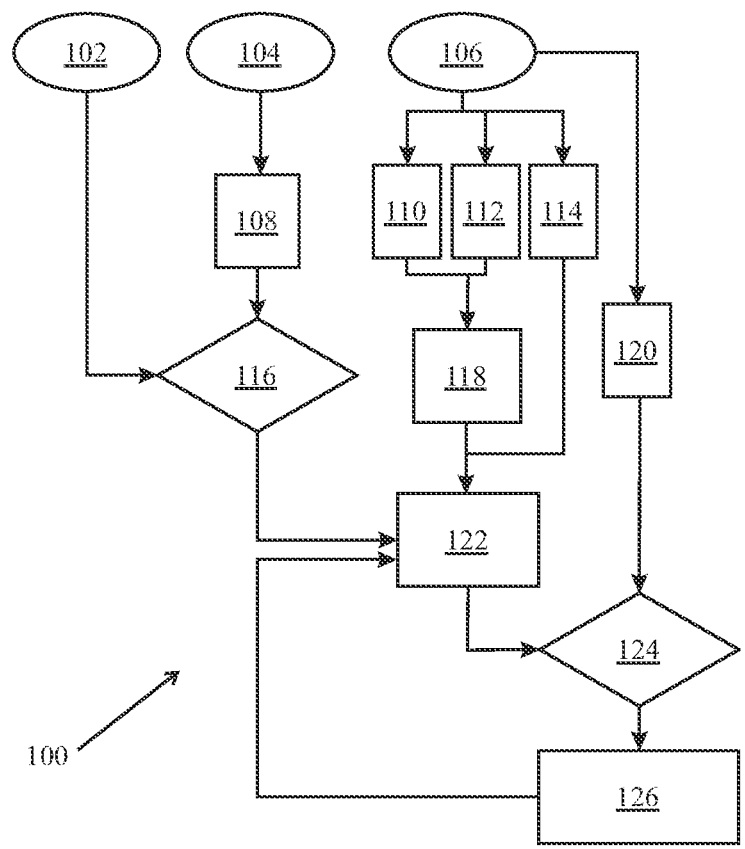
FIG. 1 depicts an illustrative variation of a flow diagram of a system and method of adaptive controller performance analyzing and algorithm optimization.

A number of variations may include a system and method including an algorithm analyzing motion controller performance in real time with respect to a set of attributes such as, but not limited to, amplitude, slew rate, frequency dosage duration, sequence, and the like.

The system and method may include an algorithm monitoring conditions such as monitoring actuations, vehicle dynamics, vehicle environment (weather, road characteristics, traffic envelope) and vehicle capability. The system and method may include an algorithm evaluating said conditions to determine which controller is best suited to the current situation during live vehicle operations.

This solution allows for more efficient application of available controller resources based on operating conditions within and around a vehicle and may be incorporated within vehicle autonomous systems or deployed in self-driving control units and controllers.

DETAILED DESCRIPTION OF ILLUSTRATIVE VARIATIONS

As used herein, "computer" or "controller," and variations on those terms, may refer broadly to a system constructed and arranged to execute the processes and steps of an algorithm or system described in this disclosure. A controller may include one or more processors in operable communication with memory through a system bus that couples various system components such as input/output (I/O) devices. Processors suitable for the execution of computer readable program instructions or processes may include both general and special purpose microprocessors and any one or more processors of any digital computing device. A controller may include standalone controller, dedicated controller, computer, or mobile computing device, a smart device, a mainframe computer system, a workstation, a network computer, a desktop computer, a laptop, or the like. A controller may be a combination of components including a processor, memory, data storage, and the like in operable communication with a variety of systems within a vehicle such as, but not limited to, electronic steering systems, traction control systems, motion control systems, propulsion systems, braking systems, autonomous and semi-autonomous driving systems, or the like.

As used herein, "operating environment" may refer broadly to roadways, highways, streets, paths, parking lots, parking structures, tunnels, bridges, traffic intersections, residential garages, or commercial garages. It is contemplated that the operating environment may include any location or space accessible by a vehicle.

A number of variations may include a system and method including an algorithm capable of analyzing motion controller performance in real time with respect to a set of attributes such as, but not limited to, amplitude, slew rate, frequency dosage duration, sequence, and the like. The algorithm may be capable of analyzing motion controller performance in real time based on prior algorithm performance or use of system resources or both.

The system and method may further include an algorithm configured to monitor operation of actuators within any number of vehicle systems and subsystems including, but not limited to, steering systems, propulsion systems, braking systems, active chassis control systems, tire monitoring systems, or vehicle vibration monitors. The system and method may monitor vehicle feedback and capability such as, but not limited to, three-dimensional acceleration, three-dimensional rotation of the vehicle around the vehicle's center of gravity, three-dimensional geomagnetic orientation, global positioning satellite derived position or pose, tire performance, energy reserves, or the like.

Further, the system and method may further be configured to monitor external vehicle operating conditions such as, but not limited to, weather, road characteristics, traffic, or the like via any number of vehicle sensor systems. Vehicle sensors may include sensors associated with cargo or passenger vehicles such as, park assist sensors, blind spot detection sensors, surround sensors, collision warning sensors, traffic sign or signal recognition sensors, emergency brake, pedestrian detection, collision avoidance sensors, or cross traffic sensors. Vehicle sensors may include radar, lidar, cameras, global positions system (GPS), global navigation satellite systems (GNSS), environmental sensors, or the like. Vehicle sensors may perform a variety of functions with respect to detecting, reading, recognizing, or interpreting data associated with local surroundings and operating environment.

The system and method may further include providing an assessment of a set of attributes including determining the type of controller best suited for a particular task and determining vehicle capability based on available performance.

The system and method may further include an algorithm capable of functioning as an input for controller selection based on optimization parameters such as run time, bandwidth, comfort requirements, accuracy. Tuning of parameters may occur either at the time of conceiving the algorithm during development, a system user can adjust some or all of the parameters based on their preference, or parameters may be tuned in real time by an algorithm optimizer. According to some embodiments, the system and method may monitor or receive information relating to the consumed processor resources to complete calculation(s) during operation of a vehicle, or to complete a given task. This can be measured by monitoring the start and finish time of the calculation functions as well as the number of concurrent processing needed to execute a given algorithm within an allotted time slot. According to some embodiments, the system and method may monitor or receive information relating to the amount of slew rate, amplitude, or oscillation allowed based on the user's preferences or task requirements. Additionally, the system may monitor or receive information relating to how close motion outputs follow the commanded trajectory.

The system and method may make an assessment based on monitored operation of actuators and monitored vehicle operating conditions to determine an appropriate control algorithm best suited during live vehicle operations on a moment-to-moment basis. Additionally, the system and method may account for planned or upcoming operation of actuators and upcoming vehicle operating conditions to determine an appropriate control algorithm best suited during live vehicle operations on a moment-to-moment basis.

The system and method may include an algorithm operating either within a domain controller or body controller or a dedicated electronic control unit (ECU) with access to monitored operation of actuators, vehicle feedback, and monitored vehicle operating conditions. The system and method may include an algorithm configured to receive required sensor messages, actuator messages or statuses relating to steering systems, braking systems, propulsion systems, or chassis health. The system and method may include an algorithm configured to receive vehicle feedback and capability in addition to environment data. Based on predetermined equations, raw data from the operation of actuators, feedback, vehicle capability, and operating conditions may be used to calculate various metrics and provided as output metrics, such as scores. The output metrics might include frequency analysis such as vibration dose value (VDV), derivatives analysis including vehicle acceleration or jerk, or vehicle lateral and longitudinal performance with respect to a reference path. Computing performance of, as a nonlimiting example, a motion planning controller may also be continuously calculated, scored, and stored. Computational data related to the resources used by the algorithm may also be considered. A set of metrics may also be stored for future algorithm performance comparison. The scoring algorithm may receive or assign appropriate predetermined weightages to output metrics based on previously determined empirical studies or neural networks to determine at least one final score.

The system and method may include an algorithm configured to monitor or receive information relating to environmental factors to determine a confidence level that a chosen algorithm will optimize the cost of operating the vehicle in the given environment. Based on various attributes such as traffic operating envelope, distance to the edge of vehicle capability, comfort level selected, and remaining energy available, the system and method may select the appropriate level complexity and performance needed to achieve the optimal target.

The system and method may be used for live or real-time controller selection, live or real-time controller calibration, and use of controllers designed for multiple operating situations based on the previously mentioned metrics and scores. Additionally, the system and method may provide for adaptive deployment of computing resources within vehicle controllers to achieve optimal use of resources including weighing of various metrics based on user requirements.

FIG. 1 depicts an illustrative variation of a flow diagram of a system and method of adaptive controller performance analyzing and algorithm optimization 100. The system and method 100 may include receiving trajectory plan data 102 and motion preferences 108 based on user selections 104. The system may determine a motion algorithm 116 based on trajectory plan data 102 and motion preferences 108. Determining a motion algorithm 116 may include communicating a motion plan, such as an immediate trajectory being communicated to the motion controller or a long term path to a destination, and characteristics prior to analyzing algorithm performance 122. Vehicle state data 106, including the collection of actuation status(es) 110, inertial status(es) 112, and computational data 114 may be characterized 118 and communicated prior to analyzing algorithm performance 122. Vehicle state data 106 may be in the form of a continuous time signal or portions of data collected over time. Vehicle state data 106 may be converted to a format recognized by the optimization function involving converting the data to another format using mathematical functions. As a non-limiting example, converting vibration signals to a single vibration dose value. Energy status 120, which may include instantaneous, average, or predicted vehicle travel range based on energy available via fuel or vehicle state of charge, and analyzed performance may be relied upon to optimize motion plan 124 prior to updating a motion planner with a selected motion algorithm with tunable parameters 126, which may also be relied upon to continuously analyze algorithm performance 122.

Figure 2:
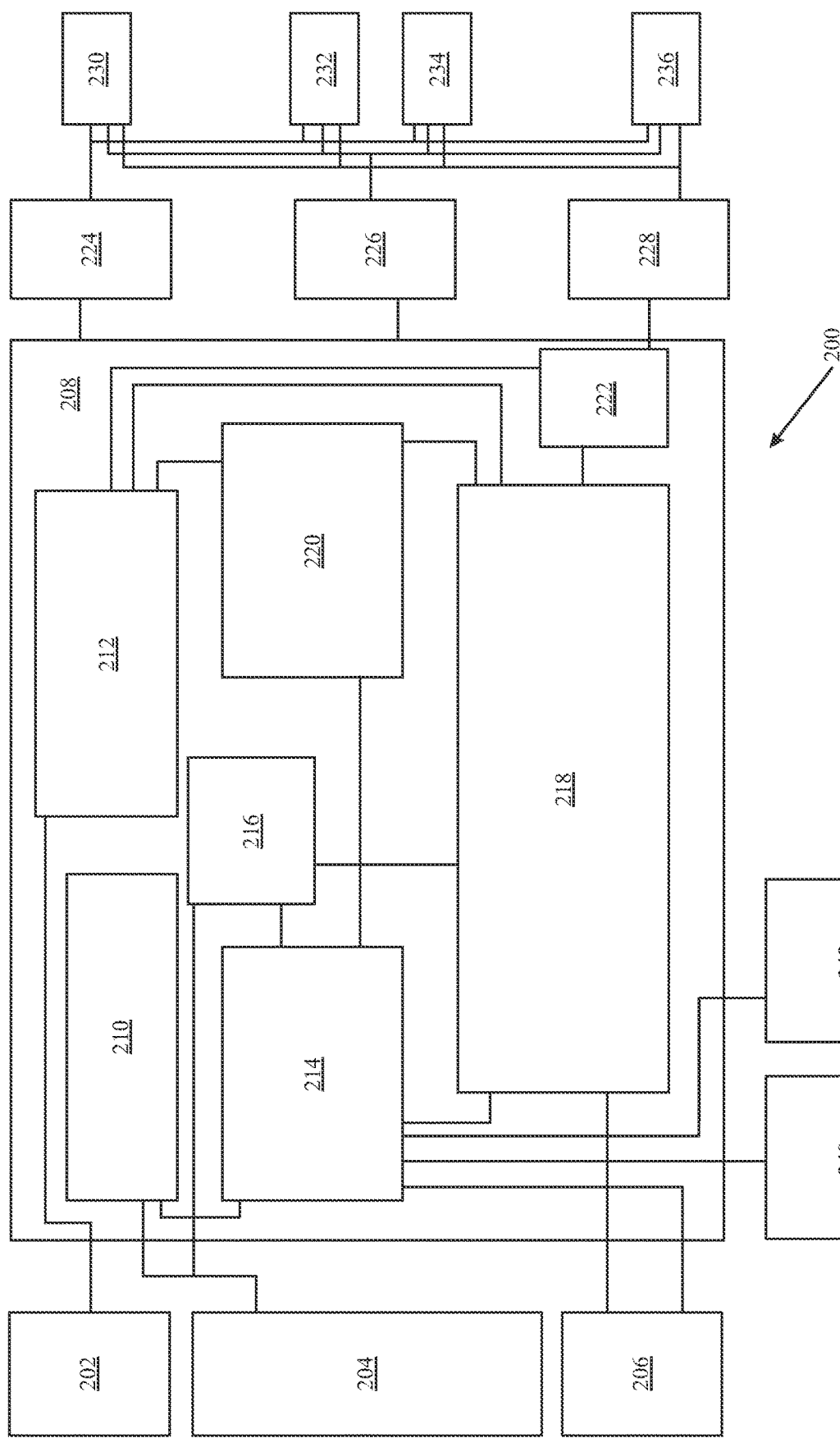
FIG. 2 depicts an illustrative variation of a block diagram of a system and method of adaptive controller performance analyzing and algorithm optimization.

FIG. 2 depicts an illustrative variation of a block diagram of a system and method of adaptive controller performance analyzing and algorithm optimization 200. Vehicle systems 208 may include a motion profile database 210, a cost function optimizer 214, a motion planner 218, collected vehicle data 212, a motion algorithm database 216, algorithm performance analyzation 220, and an actuator capability manager 22. Dynamic vehicle measurements, such as acceleration, rotation, geomagnetism, or dynamic state of vehicle motion, determined by an inertial measurement unit 202 may be communicated to the collected vehicle data 212.

A vehicle user 204 may communicate a user configuration, including motion algorithms and motion profiles, to the motion profile database 214 and the motion algorithm database 216. The profile database 210 may communicate profile attributes to the cost function optimizer 214. The cost function optimizer 214 may be configured to optimize motion profile attribute sets and vary input variables to achieve a target motion profile.

A trajectory planner 206 may communicate a planned trajectory or trajectory limits to the motion planner 218.

The motion planner 218 may provide steering commands, propulsion commands, and brake commands to the collected vehicle data 212, and subsequently onto steering actuator(s) 224, propulsion actuator(s) 226, or brake actuation controller(s) 228. The motion planner 218 may provide algorithm compute statistics to an algorithm performance analyzer 220, which may also receive data from the collected vehicle data 212, including, but not limited to, slew characteristics, frequency characteristics, amplitude characteristics, or dynamic data. The algorithm performance analyzer 220 may continuously determine a motion algorithm score to be communicated to the cost function optimizer 214 which may provide a new algorithm selection to be communicated to the algorithm database 216, which may determine algorithm rankings. Optimized tuning parameters, based on a selected algorithm, algorithm rankings, and the motion algorithm score, may be provided to the motion planner 218. From the selected algorithm and optimized tuning parameters, the motion planner 218 may issue steering, propulsion, and braking commands and may also provide algorithm compute statistics to the algorithm performance analyzer 220. The algorithm performance analyzer 220 may continue to determine motion algorithm score(s) to be communicated to the cost function optimizer 214 which may provide a new algorithm selection to be communicated to the algorithm database 216, which may determine algorithm rankings and provide optimized tuning parameters for a selected algorithm to the motion planner 218. In this way, the system may provide for continuous scoring and optimizing of algorithms within the system based on monitoring actuations, vehicle dynamics, vehicle operating environment, and vehicle capability.

Road wheel angle, wheel torque, or brake torque for each of the front left wheel 230, front right wheel 232, rear left wheel 234, or rear right wheel 236 may be communicated to steering actuator(s) 224, propulsion actuator(s) 226, or brake actuation controller(s) 228. Steering status, propulsion status, or brake status may be communicated to vehicle data 212 or the actuator capability manager 222 and the motion planner 218.

The cost function optimizer 214 may receive vehicle energy consumption data from range management systems 240. The cost function optimizer 214 may also receive state of charge data from vehicle energy management systems 242. The range management systems 240 and vehicle energy management systems 242 may be in operable communication to determine remaining energy within a vehicle.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a method may include determining at least one first motion algorithm based on trajectory plan data and motion preferences; collecting a vehicle state data including at least one of an actuation status, inertial status, or computational data; collecting energy status; characterizing the vehicle state data; analyzing performance of the at least one first motion algorithm based on at least one of the characterized vehicle state data or the at least one first motion algorithm; optimizing the motion plan based on analyzed performance of the at least one first motion algorithm and the energy status; generating an optimized at least one first motion algorithm including tunable parameters; and analyzing performance of the at least one optimized first motion algorithm based on at least one of the characterized vehicle state data or the at least one first motion algorithm.

Variation 2 may include a method as in variation 1, further including generating at least one output metric based on the at least one of an actuation status, inertial status, or computational data.

Variation 3 may include a method as in any of variations 1 through 2, wherein the at least one output metric includes at least one of vibration dose value, vehicle acceleration or jerk, or vehicle lateral and longitudinal performance with respect to a reference path.

Variation 4 may include a method as in any of variations 1 through 3, wherein analyzing performance of the at least one first motion algorithm includes monitoring consumed processor resource information during operation of the operation of the at least one first motion algorithm between a start time and a finish time.

Variation 5 may include a method as in any of variations 1 through 6, wherein analyzing performance of the at least one first motion algorithm includes monitoring motion controller output compared to motion plan.

Variation 6 may include a method as in any of variations 1 through 5, wherein determining at least one first motion algorithm based on trajectory plan data and motion preferences includes assessing monitored operation of actuators and monitored vehicle operating conditions.

According to variation 7, a method for providing continuous scoring and optimizing of algorithms within the system based on monitoring actuations, vehicle dynamics, vehicle operating environment, and vehicle capability for use in a vehicle having an electronic steering system, a position control module, an electronic steering system rack force observer, and a rack force observer vehicle diagnostic, may include determine at least one first motion algorithm based on trajectory plan data and motion preferences; collecting a vehicle state data including at least one of an actuation status, inertial status, or computational data within a vehicle; collecting energy status; characterizing the vehicle state data; analyzing performance of the at least one first motion algorithm based on at least one of the characterized vehicle state data or the at least one first motion algorithm; optimizing the motion plan based on analyzed performance of the at least one first motion algorithm and the energy status; generating an optimized at least one first motion algorithm including tunable parameters; updating a motion planner with the optimized at least one first motion algorithm; and analyzing performance of the at least one optimized first motion algorithm based on at least one of the characterized vehicle state data or the at least one first motion algorithm.

According to variation 8, a method for use in a vehicle having a motion profile database, a motion algorithm database, a trajectory planner, a cost function optimizer, a motion planner, and an algorithm performance analyzer may include receiving trajectory plan data from the trajectory planner; receiving motion preferences based on user selections; determining at least one motion profile attribute via the motion profile database; selecting at least one first motion algorithm based on trajectory plan data, the at least one motion profile attribute, and motion preferences; collecting a vehicle state data including at least one of an actuation status, inertial status, or computational data; collecting energy status; characterizing the vehicle state data; analyzing performance of the at least one first motion algorithm by determining a first motion algorithm score based on at least one of the characterized vehicle state data or the at least one first motion algorithm; optimizing the motion plan based on analyzed performance of the at least one first motion algorithm and the energy status; generating an optimized at least one first motion algorithm including tunable parameters; analyzing performance of the at least one optimized first motion algorithm by determining a second motion algorithm score based on at least one of the characterized vehicle state data or the at least one first motion algorithm.

Variation 9 may include method as in variation 8, further including comparing the first motion algorithm score and the second motion algorithm score.

Variation 10 may include method as in any of variations 8 through 9 wherein applying at least one weightage to at least one of the first motion algorithm score or second motion algorithm score; determining a final first motion algorithm score; and determining a final second motion algorithm score.

Variation 11 may include method as in any of variations 8 through 10 further including ranking algorithms based on the first motion algorithm score or the second motion algorithm score.

Variation 12 may include method as in any of variations 8 through 11 wherein tunable parameters are determined based on the at least one first motion algorithm, second motion algorithm score, or algorithm rankings.

Variation 13 may include method as in any of variations 8 through 12 further including providing continuous scoring and optimizing of algorithms within the system based on monitoring actuations, vehicle dynamics, vehicle operating environment, and vehicle capability.

The above description of select variations within the scope of the invention is merely illustrative in nature and, thus, variations or variants thereof are not to be regarded as a departure from the spirit and scope of the invention.

What is claimed is:

1. A method of controlling an autonomous vehicle, the method comprising:
   determining a path to be traveled by the autonomous vehicle;
   selecting a motion control algorithm from among a first motion control algorithm configured to autonomously control the autonomous vehicle to travel along the path and a second motion control algorithm configured to autonomously control the autonomous vehicle to travel along the path;
   determining a first performance of the first motion control algorithm controlling the autonomous vehicle to autonomously travel along the path wherein the first performance is based on comparing the first motion control algorithm to a motion profile database;
   determining a second performance of the second motion control algorithm controlling the autonomous vehicle to autonomously travel along the path wherein the second performance is based on comparing the first motion control algorithm to the motion profile database; and
   selecting the motion control algorithm based on which of the first performance and the second performance is closer to a target motion profile in the motion profile database, wherein the target motion profile is based on a plurality of performance attributes; and
   controlling the autonomous vehicle to autonomously travel along the path using the selected motion control algorithm.

2. The method of claim 1, wherein the first performance comprises (i) a first acceleration to be applied to the autonomous vehicle to autonomously travel along the path and (ii) first lateral and longitudinal control applied to the autonomous vehicle to autonomously travel along the path, and wherein the second performance comprises (i) a second acceleration to be applied to the autonomous vehicle to autonomously travel along the path and (ii) second lateral and longitudinal control applied to the autonomous vehicle to autonomously travel along the path.

3. The method of claim 1, further comprising determining weather conditions in an environment surrounding the autonomous vehicle,
   wherein the first performance comprises (i) the first acceleration to be applied to the autonomous vehicle to autonomously travel along the path based on the weather conditions and (ii) the first lateral and longitudinal control applied to the autonomous vehicle to autonomously travel along the path based on the weather conditions, and
   wherein the second performance comprises (i) the second acceleration to be applied to the autonomous vehicle to autonomously travel along the path based on the weather conditions and (ii) the second lateral and longitudinal control applied to the autonomous vehicle to autonomously travel along the path based on the weather conditions.

4. The method of claim 1, further comprising determining road characteristics of a road on the path to be traveled by the autonomous vehicle,
   wherein the road characteristics are temporary external vehicle operating conditions,
   wherein the first performance comprises (i) the first acceleration to be applied to the autonomous vehicle to autonomously travel along the path based on the road characteristics and (ii) the first lateral and longitudinal control applied to the autonomous vehicle to autonomously travel along the path based on the road characteristics, and
   wherein the second performance comprises (i) the second acceleration to be applied to the autonomous vehicle to autonomously travel along the path based on the road characteristics and (ii) the second lateral and longitudinal control applied to the autonomous vehicle to autonomously travel along the path based on the road characteristics.

5. The method of claim 1, further comprising determining a travel range of the autonomous vehicle,
   wherein the first performance comprises (i) the first acceleration to be applied to the autonomous vehicle to autonomously travel along the path based on the travel range and (ii) the first lateral and longitudinal control applied to the autonomous vehicle to autonomously travel along the path based on the travel range, and
   wherein the second performance comprises (i) the second acceleration to be applied to the autonomous vehicle to autonomously travel along the path based on the travel range and (ii) the second lateral and longitudinal control applied to the autonomous vehicle to autonomously travel along the path based on the travel range.

6. The method of claim 1, further comprising:
   determining weather conditions in an environment surrounding the autonomous vehicle;
   determining road characteristics of a road on the path to be traveled by the autonomous vehicle; and
   determining a travel range of the autonomous vehicle,
   wherein the first performance comprises (i) the first acceleration to be applied to the autonomous vehicle to autonomously travel along the path based on the weather conditions, the road characteristics, and the travel range, and (ii) the first lateral and longitudinal control applied to the autonomous vehicle to autonomously travel along the path based on the weather conditions, the road characteristics, and the travel range, and wherein the second performance comprises (i) the second acceleration to be applied to the autonomous vehicle to autonomously travel along the path based on the weather conditions, the road characteristics, and the travel range, and (ii) the second lateral and longitudinal control applied to the autonomous vehicle to autonomously travel along the path based on the weather conditions, the road characteristics, and the travel range.

7. The method of claim 1, further comprising:
determining weather conditions in an environment surrounding the autonomous vehicle;
determining road characteristics of a road on the path to be traveled by the autonomous vehicle; and
determining a travel range of the autonomous vehicle,
wherein the first performance comprises (i) the first acceleration to be applied to the autonomous vehicle to autonomously travel along the path based on at least one of the weather conditions, the road characteristics, and the travel range, and (ii) the first lateral and longitudinal control applied to the autonomous vehicle to autonomously travel along the path based on at least one of the weather conditions, the road characteristics, and the travel range, and
wherein the second performance comprises (i) the second acceleration to be applied to the autonomous vehicle to autonomously travel along the path based on at least one of the weather conditions, the road characteristics, and the travel range, and (ii) the second lateral and longitudinal control applied to the autonomous vehicle to autonomously travel along the path based on at least one of the weather conditions, the road characteristics, and the travel range.

8. The method of claim 1, wherein the first performance comprises at least one of a first amplitude, a first slew rate, a first frequency dosage duration, and a first sequence, and
wherein the second performance comprises at least one of a second amplitude, a second slew rate, a second frequency dosage duration, and a second sequence.

9. The method of claim 1, wherein the first performance comprises a first vibration dose value, and
wherein the second performance comprises a second vibration dose value.

10. The method of claim 1, further comprising monitoring actuations of actuators of the autonomous vehicle,
wherein selecting the motion control algorithm comprises:
determining the first performance of the first motion control algorithm controlling the autonomous vehicle to autonomously travel along the path based on the actuations;
determining the second performance of the second motion control algorithm controlling the autonomous vehicle to autonomously travel along the path based on the actuations; and
selecting the motion control algorithm based on the first performance and the second performance.

11. The method of claim 10, wherein the actuators comprise at least one of actuators of at least one of a steering system of the autonomous vehicle, a propulsion system of the autonomous vehicle, a braking system of the autonomous vehicle, an active chassis control system of the autonomous vehicle, a tire monitoring system of the autonomous vehicle, and a vehicle vibration monitor of the autonomous vehicle.

12. The method of claim 10, wherein the actuators comprise actuators of a steering system of the autonomous vehicle, a propulsion system of the autonomous vehicle, a braking system of the autonomous vehicle, an active chassis control system of the autonomous vehicle, a tire monitoring system of the autonomous vehicle, and a vehicle vibration monitor of the autonomous vehicle.

13. The method of claim 1, further comprising monitoring vehicle dynamics of the autonomous vehicle,
wherein selecting the motion control algorithm comprises:
determining the first performance of the first motion control algorithm controlling the autonomous vehicle to autonomously travel along the path based on the vehicle dynamics;
determining the second performance of the second motion control algorithm controlling the autonomous vehicle to autonomously travel along the path based on the vehicle dynamics; and
selecting the motion control algorithm based on the first performance and the second performance.

14. The method of claim 1, further comprising monitoring a vehicle environment of the autonomous vehicle, wherein selecting the motion control algorithm comprises:
determining the first performance of the first motion control algorithm controlling the autonomous vehicle to autonomously travel along the path based on the vehicle environment;
determining the second performance of the second motion control algorithm controlling the autonomous vehicle to autonomously travel along the path based on the vehicle environment;
and selecting the motion control algorithm based on the first performance and the second performance.

15. The method of claim 1, further comprising monitoring a vehicle capability of the autonomous vehicle,
wherein selecting the motion control algorithm comprises:
determining the first performance of the first motion control algorithm controlling the autonomous vehicle to autonomously travel along the path based on the vehicle capability;
determining the second performance of the second motion control algorithm controlling the autonomous vehicle to autonomously travel along the path based on the vehicle capability; and
selecting the motion control algorithm based on the first performance and the second performance.

16. The method of claim 1, wherein the plurality of performance attributes comprise at least one of amplitude, slew rate, frequency dosage duration, sequence, traffic operating envelope, distance to the edge of vehicle capability, comfort level selected, and remaining energy available.

* * * * *